US009825761B2

(12) United States Patent
Mahmud et al.

(10) Patent No.: US 9,825,761 B2
(45) Date of Patent: Nov. 21, 2017

(54) SYSTEMS AND METHODS IMPROVING CRYPTOSYSTEMS WITH BIOMETRICS

(75) Inventors: Maqsood Mahmud, Riyadh (SA); Muhammad Khurram Khan, Riyadh (SA); Khaled Soliman Alghathbar, Riyadh (SA)

(73) Assignee: King Saud University, Riyadh (SA)

( * ) Notice: Subject to any disclaimer, the term of this patent is extended or adjusted under 35 U.S.C. 154(b) by 636 days.

(21) Appl. No.: 12/755,363

(22) Filed: Apr. 6, 2010

(65) Prior Publication Data

US 2011/0246768 A1    Oct. 6, 2011

(51) Int. Cl.
*H04L 9/08* (2006.01)
*H04L 9/06* (2006.01)

(52) U.S. Cl.
CPC .......... *H04L 9/0866* (2013.01); *H04L 9/0662* (2013.01)

(58) Field of Classification Search
None
See application file for complete search history.

(56) References Cited

U.S. PATENT DOCUMENTS

| | | | | |
|---|---|---|---|---|
| 5,291,560 A | * | 3/1994 | Daugman | 382/117 |
| 6,278,780 B1 | * | 8/2001 | Shimada | 380/47 |
| 6,507,912 B1 | * | 1/2003 | Matyas | 713/186 |
| 7,278,085 B1 | * | 10/2007 | Weng et al. | 714/766 |
| 7,949,881 B2 | * | 5/2011 | Imura | 713/186 |
| 8,078,885 B2 | * | 12/2011 | Jobmann | 713/186 |
| 2004/0015610 A1 | * | 1/2004 | Treadwell | 709/246 |
| 2005/0021984 A1 | * | 1/2005 | Hollander | 713/186 |
| 2006/0015549 A1 | * | 1/2006 | Chren | 708/446 |
| 2006/0222013 A1 | * | 10/2006 | Ban | 370/474 |
| 2007/0239994 A1 | * | 10/2007 | Kulkarni et al. | 713/189 |

* cited by examiner

*Primary Examiner* — Benjamin Lanier
(74) *Attorney, Agent, or Firm* — Hauptman Ham, LLP

(57) ABSTRACT

In one aspect, systems and methods to improve a cryptosystem include computer-implemented operations such as scanning a biometric attribute for comparison with stored biometric data, and generating a keystream based upon the stored biometric data if the scanned biometric attribute substantially matches the stored biometric data. The computer-implemented method may also include operations for encrypting object data, and encrypting final data based upon the keystream and the encrypted object data.

1 Claim, 11 Drawing Sheets

SYSTEMS AND METHODS IMPROVING CRYPTOSYSTEMS WITH BIOMETRICS

BACKGROUND

Biometrics refers to methods for uniquely recognizing humans based upon one or more intrinsic physical or behavioral traits. In information technology, in particular, biometrics is used as a form of identity access management and access control.

In cryptography, a stream cipher is a symmetric key cipher where plaintext bits are combined with a pseudorandom key bit stream (key stream), typically by an exclusive-or (xor) operation. In a stream cipher the plaintext digits are encrypted one at a time, and the transformation of successive digits varies during the encryption. An alternative name is a state cipher, as the encryption of each digit is dependent on the current state. In practice, the digits are typically single bits or bytes.

SUMMARY

A computer-implemented method to improve a cryptosystem may include operations for scanning a biometric attribute for comparison with stored biometric data, and generating a keystream based upon the stored biometric data if the scanned biometric attribute substantially matches the stored biometric data. The computer-implemented method may also include operations for encrypting object data, and encrypting final data based upon the keystream and the encrypted object data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

For a more complete understanding of the features and advantages of the following described systems and methods for improving a cryptosystem, reference is now made to the detailed description along with the different figures refer to corresponding parts and in which:

FIG. 11 shows one step of an 11 bit LFSR with initial seed 01101000010 and tap at position 8.

DETAILED DESCRIPTION

Overview

The following description details systems and methods to improve cryptosystems, which in one implementation, provides biometric-gaussian-stream (BGS) cipher with new aspect of image encryption—data hiding. More specifically, the systems (e.g., system 10 of FIG. 1, which is described below) and methods (e.g., methods of FIGS. 2 through 17, each of which are described below) encrypt any image/biometric template using stream cipher and a Gaussian noise function while using biometric data as an encryption key. For example, in one exemplary embodiment, the system uses a Gabor wavelet to generate iriscode for iris bits ($\Theta$) generation. In another embodiment, the system utilizes smart card technology comprising stored biometric data. The keystream used in this novel system is generated with help of biometrics (e.g., an Iris code) to encrypt multimedia objects like a picture or even an iris image. As described in greater detail below, the selection of bits for inputs to a linear feedback shift register ("LFSR") key is done, for example, by hamming code method.

Systems and methods for improving crypto systems are now described in greater detail with reference to the accompanying drawings. In this description, like numbers refer to like elements throughout, like numbers with letter suffixes identify similar parts in a single embodiment, and letter suffix lower case n is a variable that indicates an unlimited number of similar elements.

Exemplary Systems and Methodologies

Figure 1:
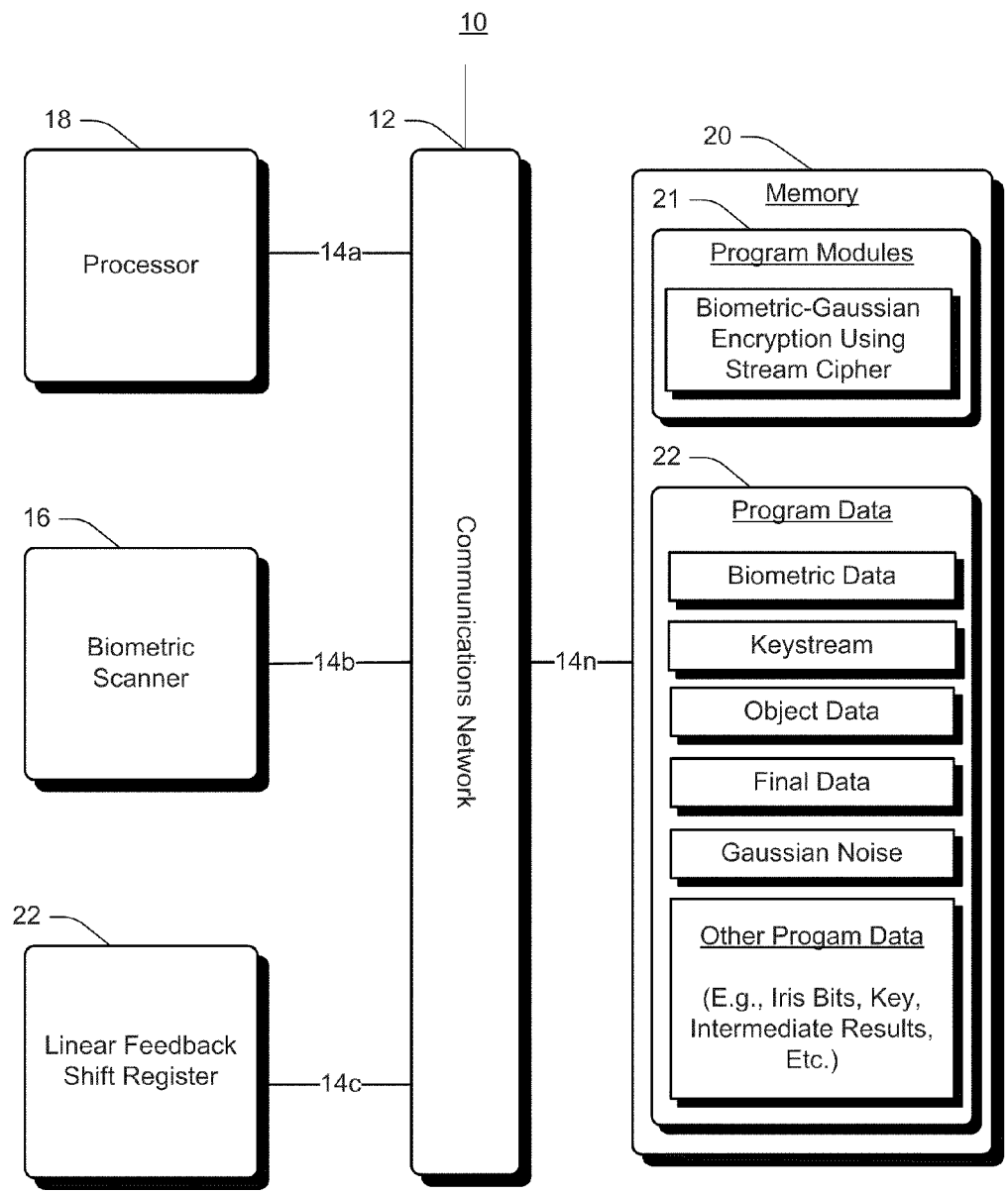
FIG. 1 is a schematic block diagram of a system to improve a cryptosystem, according to one embodiment.

With reference now to FIG. 1, a system 10 to provide an improved cryptosystem is initially described. The system 10 is a programmable apparatus that stores and manipulates data according to an instruction set as will be appreciated by those of skill in the art. In one embodiment, the system 10 includes a communications network 12, which enables a signal to travel anywhere within system 10 and/or to any other system operatively coupled to system 10. The communications network 12 is wired and/or wireless, for example. The communications network 12 is local and/or global with respect to system 10, for instance. The communications network 12 includes communications links 14a-14n.

In one embodiment, the system 10 includes a device to obtain and provide information related to a biometric attribute. Biometric attributes include, for example, a fingerprint, palm geometry, speech, gait, iris, etc. In one implementation, for example, the device is a biometric scanner 16 to obtain and/or interpret a biometric attribute. In other words, the biometric scanner 16 interacts with a user to gather data, e.g. biometric attribute, about the user. In addition, the system 10 includes a processor 18 operatively coupled to a computer-readable media or memory 20. Memory 20 comprises computer program modules 21 comprising processor executable computer-program instructions and computer program data 22. Processor 18 executes the computer-program instructions to perform data I/O and otherwise manipulate the program data to provide for improved cryptosystems.

In one embodiment, program modules 21 includes a module for Biometric Gaussian Encryption Using Stream Cipher (BGESC) comprising computer executable instructions that when executed by the processor 18 performs an operation that compares the scanned biometric attribute with stored biometric data. In another embodiment, the memory 20 computer-executable instructions (e.g., the instructions of BGESC module) when executed by the processor 18 performs an operation that generates a keystream based upon the stored biometric data if the scanned biometric attribute substantially matches the stored biometric data. In another embodiment, the memory 20 includes computer-executable instructions that when executed by the processor 18 perform an operation that encrypts object data (shown as respective portion of program data 22). In one implementation, for example, object data is a plain image in binary form. In another embodiment, the memory 20 includes computer-executable instructions (e.g., BGESC module) that when executed by the processor 18 perform an operation that encrypts final data based upon the keystream and the encrypted object data. In one implementation, for example, final data is the image in binary with Gaussian noise added into it.

In one embodiment, the system 10 includes a Linear Feedback Shift Register ("LFSR") 22 that communicates with the processor 18 to generate the keystream. In another embodiment, the system 10 includes a Gaussian noise function and/or the Linear Feedback Shift Register (LFSR) 22 that communicate with the processor 18 to encrypt the object data. In another embodiment, the system 10 implements a Gabor wavelet function that communicates with the processor 18 to convert information associated with the biometric attribute into iris bits that are used as a key for encryption and decryption of the final data.

In one exemplary implementation, system 10 uses J. G. Daugman's proposed algorithm for the Iris code generation, which uses a Gabor Wavelet equation to extract the phase of the iris image. These iris bits are utilized by the system to extract specific bits using hamming method to feed the LFSR. In another embodiment, system 10 adds Gaussian noise using a Gaussian function with variance (v) and mean LFSR. The Gaussian noise added to the image is further passed through the LFSR to encrypt it. In one implementation, the system performs decryption in a reverse order as compared to what is usually done in state-of-the-art cryptosystems. The system takes the mean (m) and variance (v) as parallel keys in addition with the Initial Condition of the LFSR.

Figure 2:
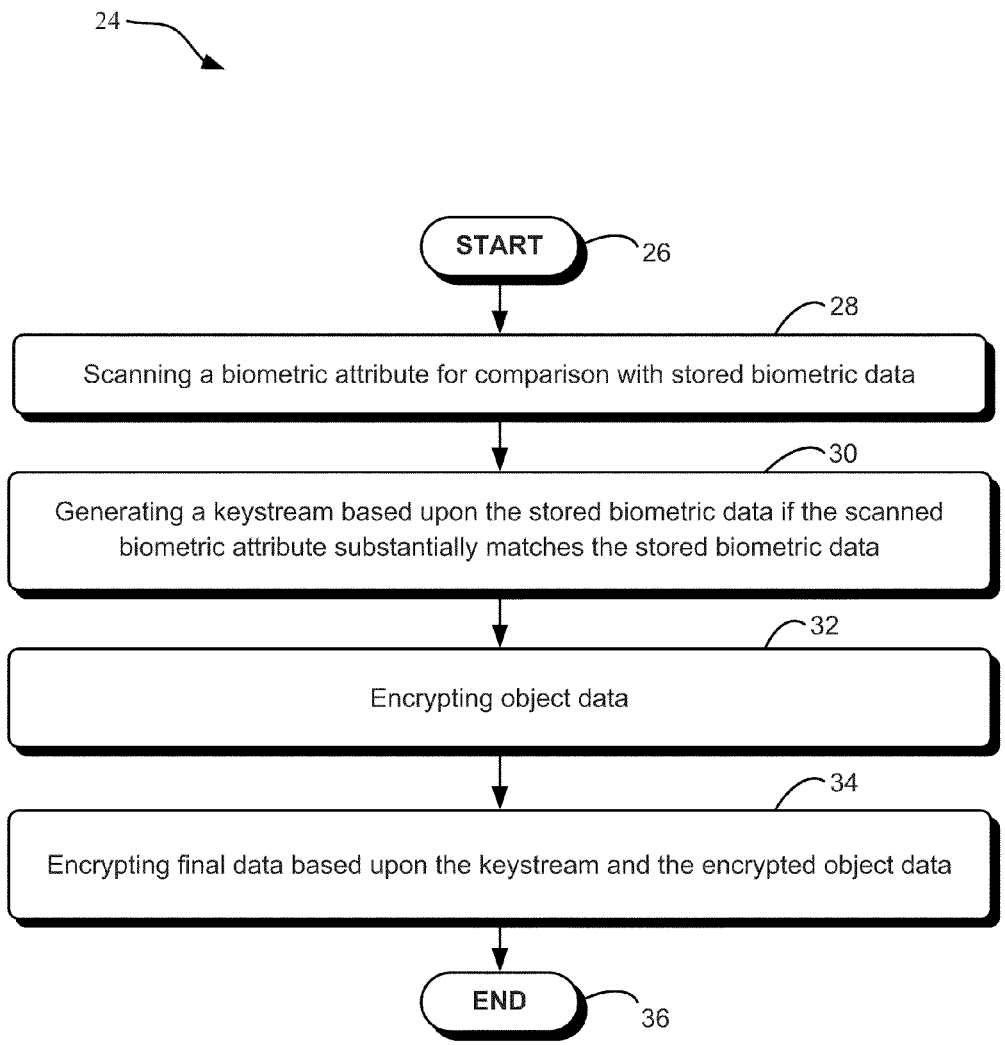
FIG. 2 is a flowchart illustrating a methodology to improve a cryptosystem with biometric data, according to one embodiment.

FIG. 2 shows an exemplary computer-implemented procedure 24 for an improved cryptosystem, according to one embodiment. Operations of Block 26 include, for example, scanning a biometric attribute for comparison with stored biometric data at Block 28. The method may further include generating a keystream based upon the stored biometric data if the scanned biometric attribute substantially matches the stored biometric data at Block 30. The method may additionally include encrypting object data at Block 32. The method may also include encrypting final data based upon the keystream and the encrypted object data at Block 34. The method ends at Block 36.

Figure 3:
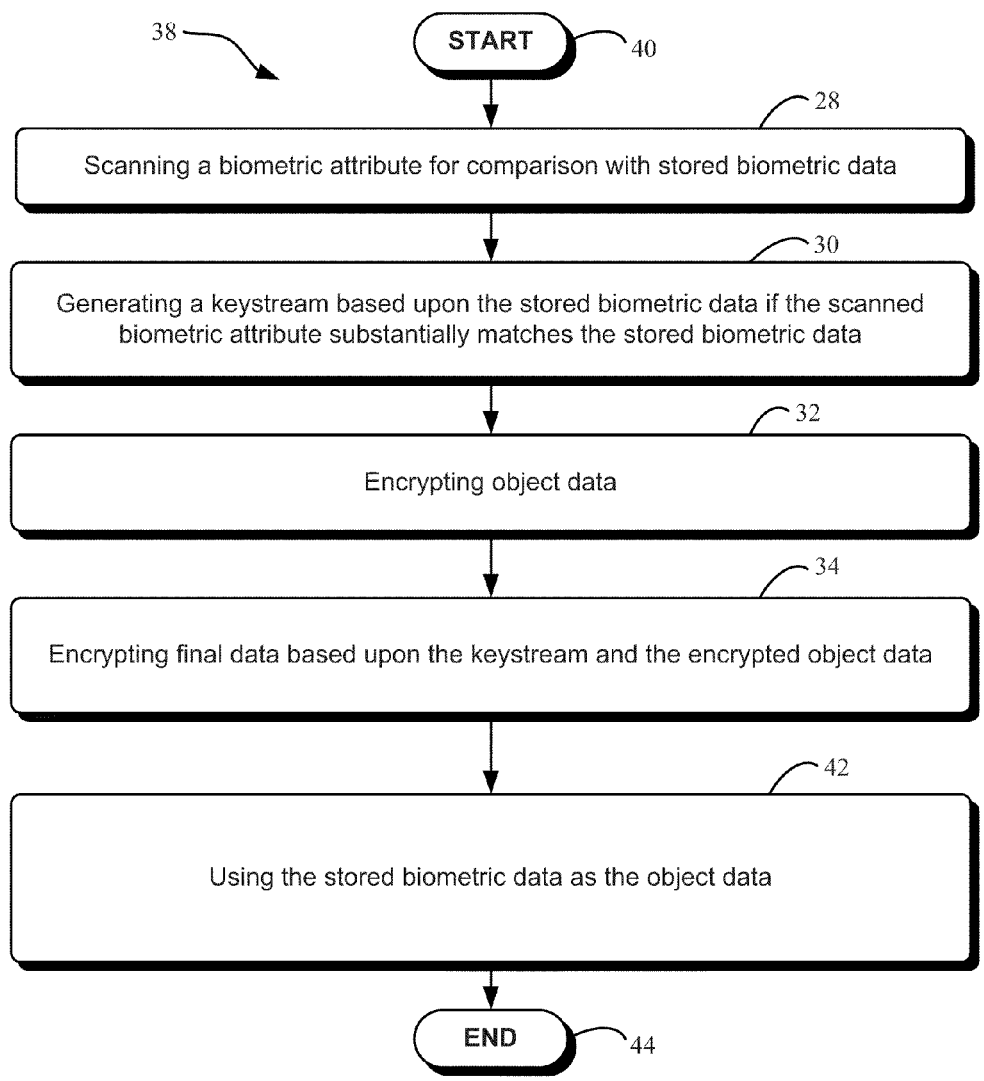
FIG. 3 shows further aspects of an exemplary procedure to improve a cryptosystem using biometric data, according to one embodiment.

FIG. 3 shows further aspects of the exemplary procedure 38 for improved cryptosystem as described above with respect to FIG. 2, according to one embodiment. Operations again at Block 40 may include the steps described above in reference to operations of FIG. 2 at Blocks 28, 30, 32, and 34. The method may additionally include an operation to use the stored biometric data as the object data at Block 42. The exemplary method of FIG. 3 ends at Block 44.

Figure 4:
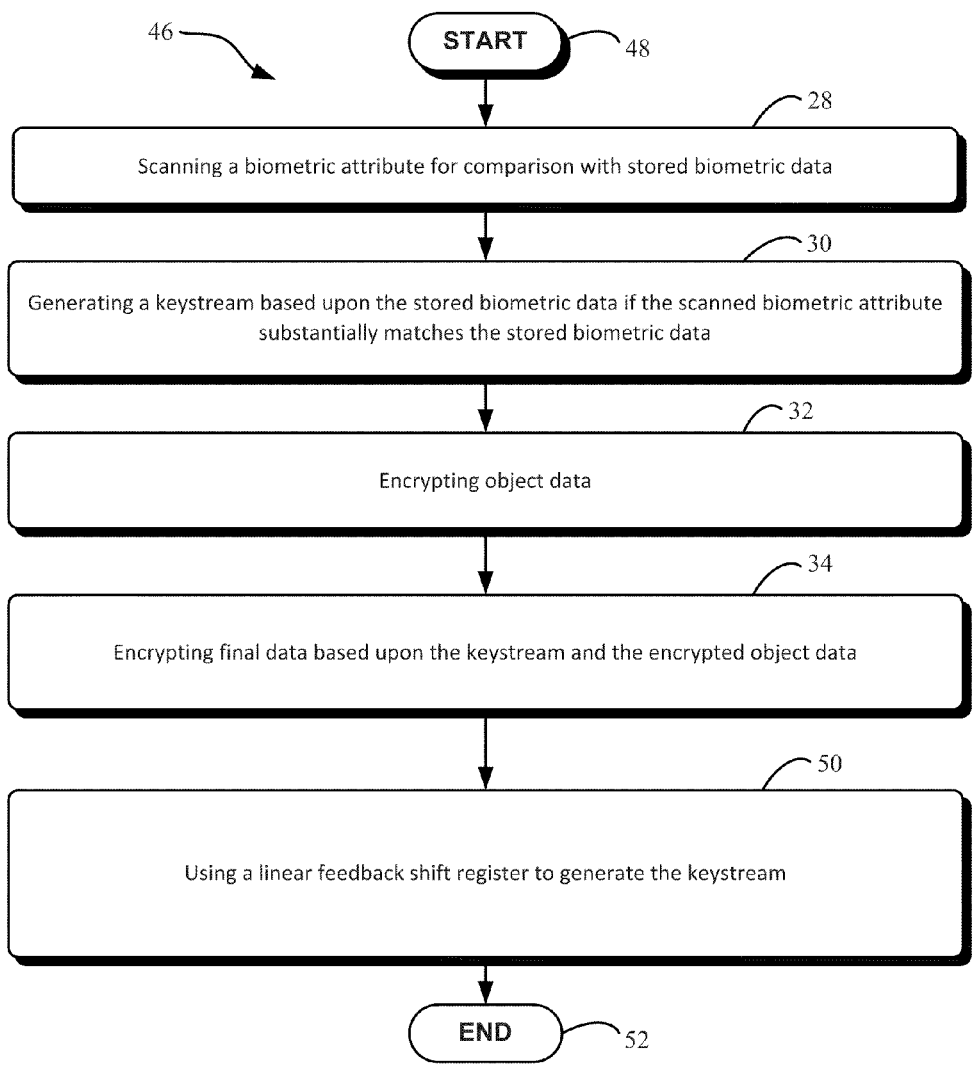
FIG. 4 shows further aspects of an exemplary procedure to improve cryptosystem using biometric data, according to one embodiment.

FIG. 4 shows further exemplary aspects of a methodology 46 for improved cryptosystem, according to one embodiment. The procedure begins at Block 48. In this implementation, the method may include the steps of FIG. 2 at Blocks 28, 30, 32, and 34. The method may additionally include using a linear feedback shift register to generate the keystream at Block 50. The method ends at Block 52.

Figure 5:
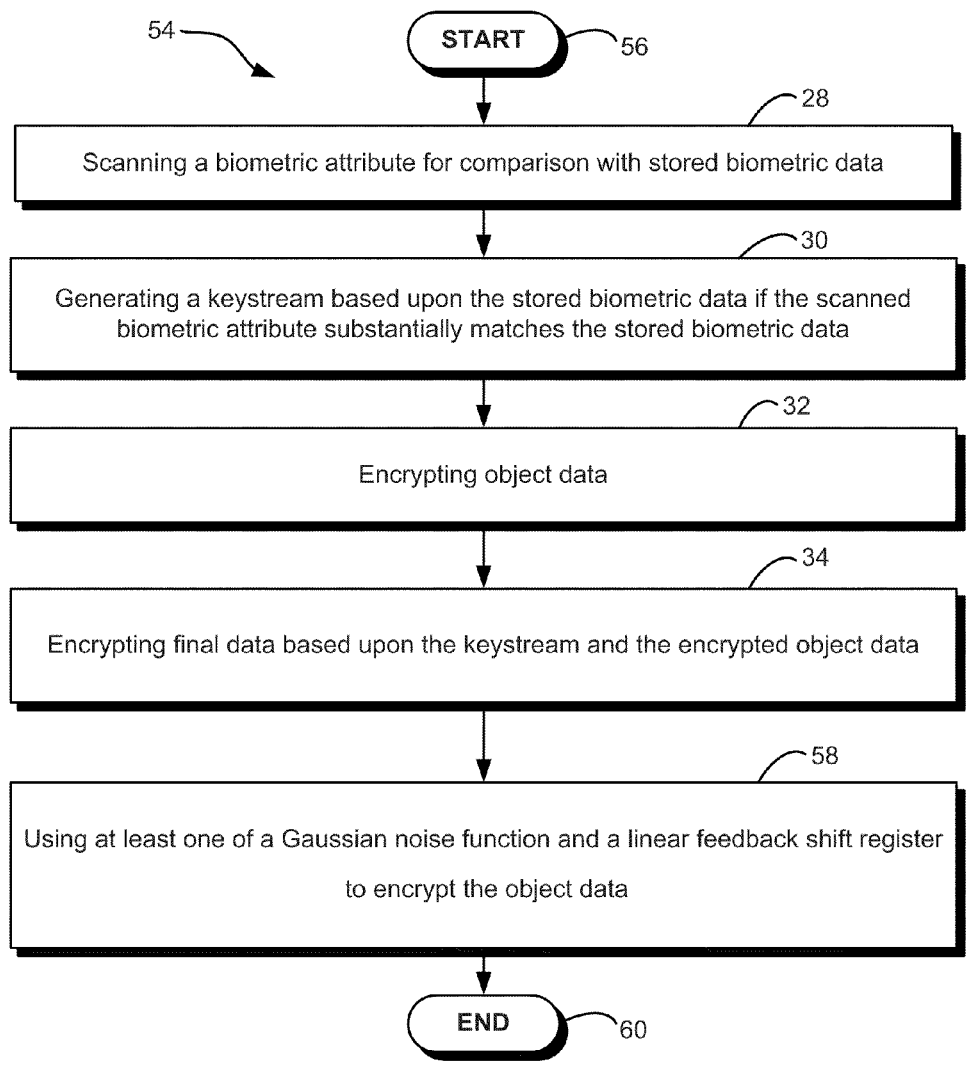
FIG. 5 illustrates additional methodological aspects to improve a cryptosystem using biometric data and Gaussian noise, according to one embodiment.

FIG. 5 shows additional exemplary aspects of a procedure 54 for an improved cryptosystem, according to one embodiment. The procedure begins at Block 56. As shown, the procedure may include the steps of FIG. 2 at Blocks 28, 30, 32, and 34. The procedure/method may additionally include using at least one of a Gaussian noise function and a linear feedback shift register to encrypt the object data at Block 58. The method ends at Block 60.

Figure 6:
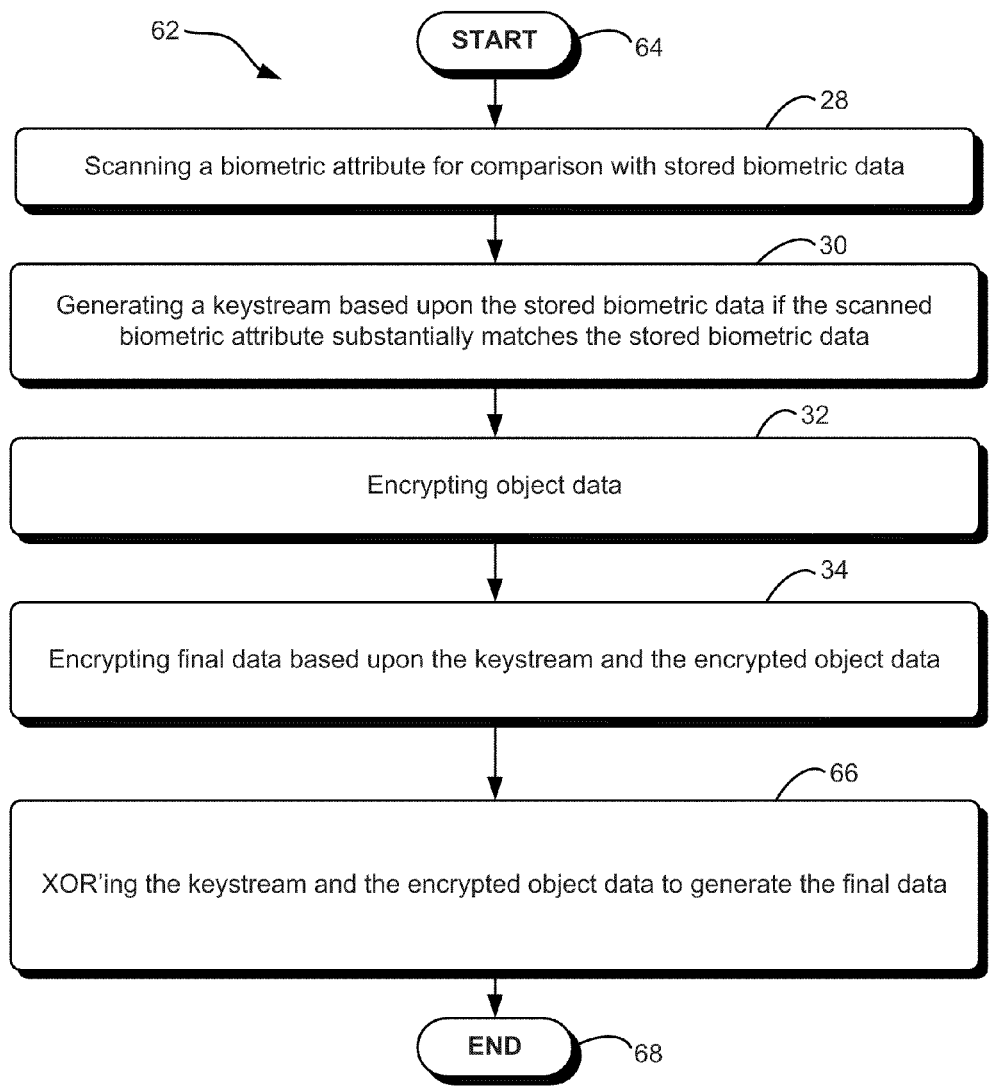
FIG. 6 is a flowchart illustrating method aspects according to the method of FIG. 2, according to one embodiment.

In another exemplary method embodiment, which is now described with reference to flowchart 62 of FIG. 6, the method begins at Block 64. The method may include the steps of FIG. 2 at Blocks 28, 30, 32, and 34. The method may additionally include XOR'ing the keystream and the encrypted object data to generate the final data at Block 66. The method ends at Block 68.

Figure 7:
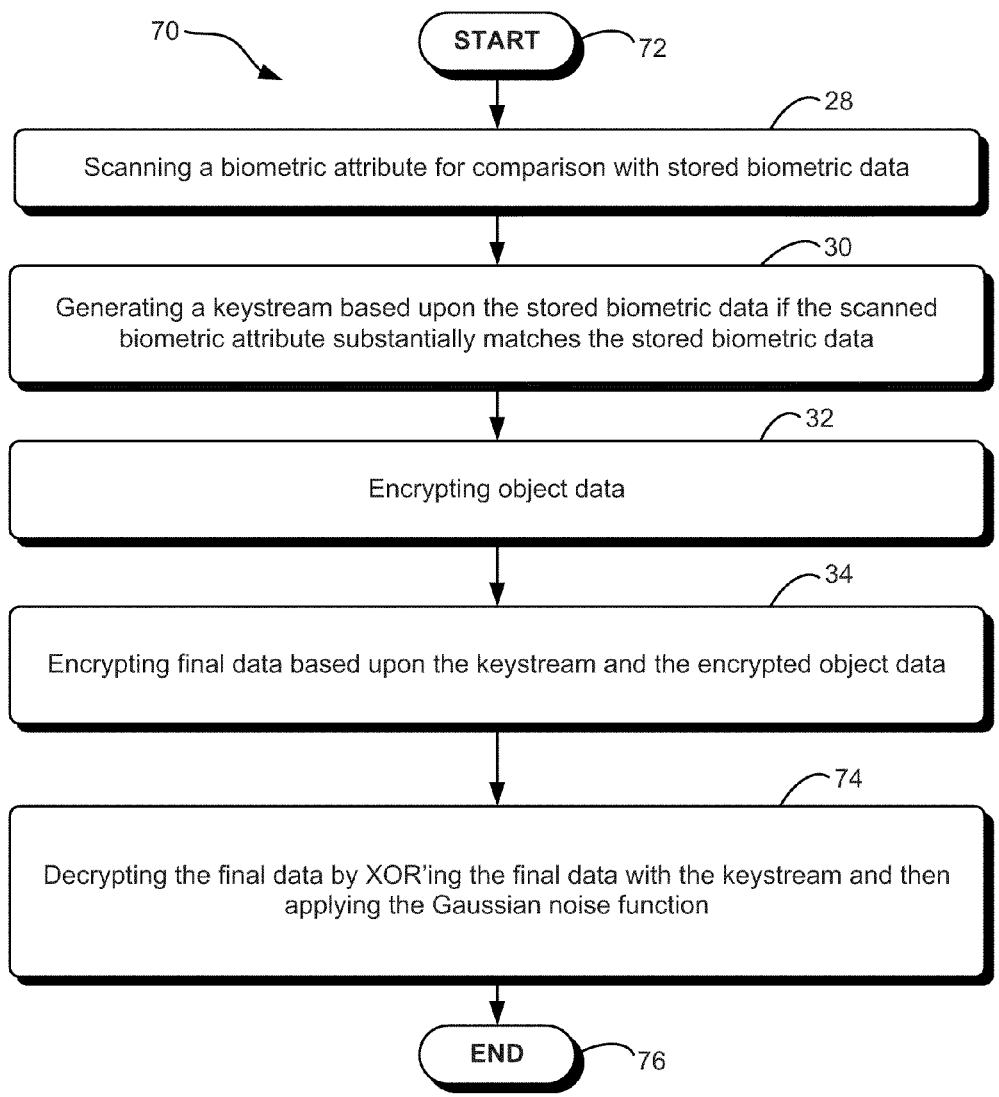
FIG. 7 shows further procedural aspects of a methodology of FIG. 2, additionally include decrypting final data based on a keystream and then applying a Gaussian noise function, according to one embodiment.

FIG. 7 shows further aspects of an exemplary procedure for improved cryptosystem, according to one embodiment. In particular, procedure 70 of FIG. 7 begins at Block 72. The method may include the steps of FIG. 2 at Blocks 28, 30, 32, and 34. The method may additionally include decrypting the final data by XOR'ing the final data with the keystream and then applying the Gaussian noise function at Block 74. The method ends at Block 76.

Figure 8:
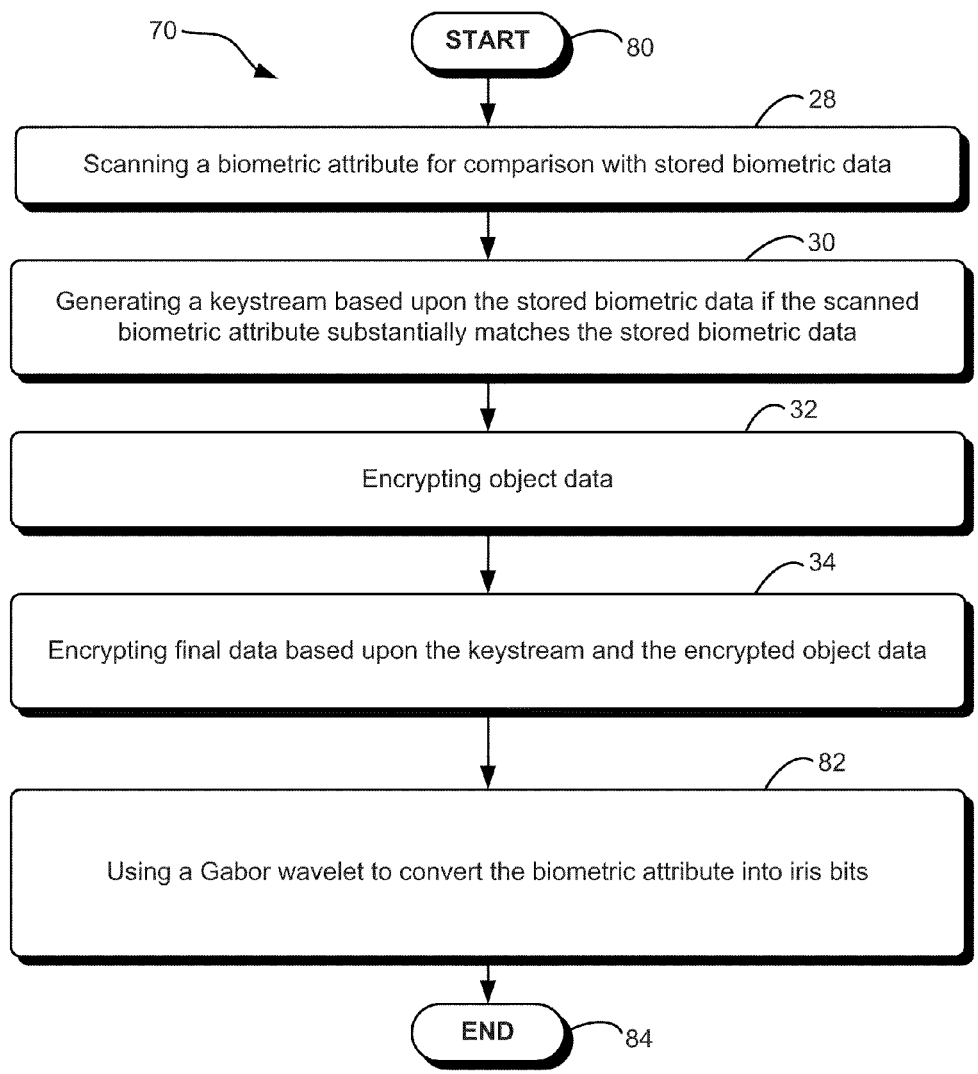
FIG. 8 illustrates further methodological aspects of the procedure described with respect to FIG. 2, wherein a Gabor wavelet is utilized to convert a biometric attribute into iris bits, according to one embodiment.

In another exemplary method embodiment, which is now described with reference to flowchart 78 of FIG. 8, the method begins at Block 80. The method may include the steps of FIG. 2 at Blocks 28, 30, 32, and 34. The method may additionally include using a Gabor wavelet to convert the biometric attribute into iris bits at Block 82. The method ends at Block 84.

Figure 9:
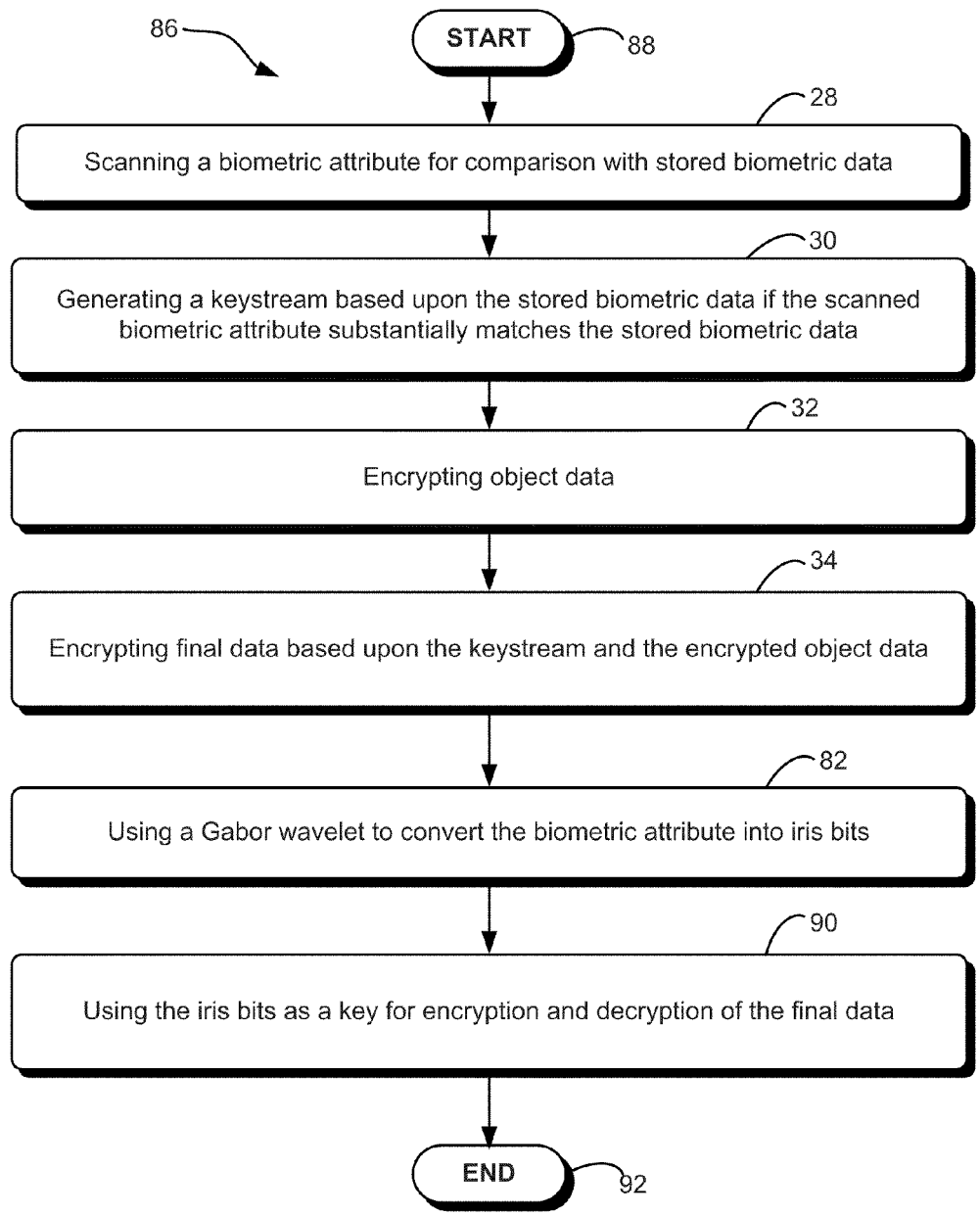
FIG. 9 is a flowchart illustrating method aspects according to the method of FIG. 8, according to one embodiment.

In another exemplary method embodiment, which is now described with reference to flowchart 86 of FIG. 9, the method begins at Block 88. The method may include the steps of FIG. 8 at Blocks 28, 30, 32, 34, and 82. The method may additionally include using the iris bits as a key for encryption and decryption of the final data at Block 90. The method ends at Block 92.

Figure 10:
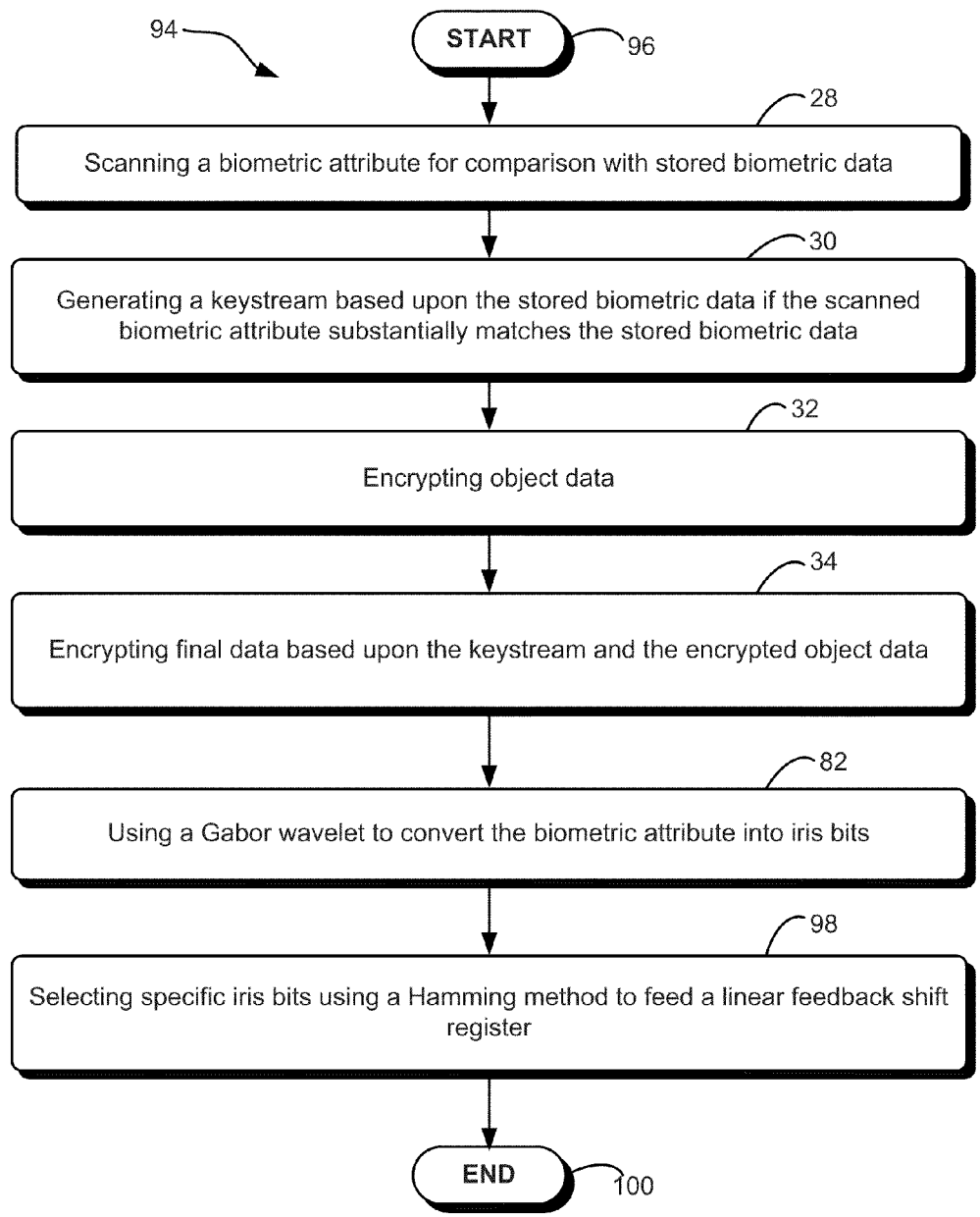
FIG. 10 is a flowchart illustrating further procedural aspects of the method of FIG. 8, according to one embodiment.

In another method embodiment, which is now described with reference to flowchart 94 of FIG. 10, the method begins at Block 96. The method may include the steps of FIG. 8 at Blocks 28, 30, 32, 34, and 82. The method may additionally include selecting specific iris bits using a Hamming method to feed a linear feedback shift register at Block 98. The method ends at Block 100.

Another exemplary aspect of the system 10 is a computer-readable medium comprising computer-executable instructions that when executed by a processor 18 performing operations may include scanning a biometric attribute for comparison with stored biometric data, and generating a keystream based upon the stored biometric data if the scanned biometric attribute substantially matches the stored biometric data. The computer-executable instructions may also include encrypting object data, and encrypting final data based upon the keystream and the encrypted object data.

Figure 11:
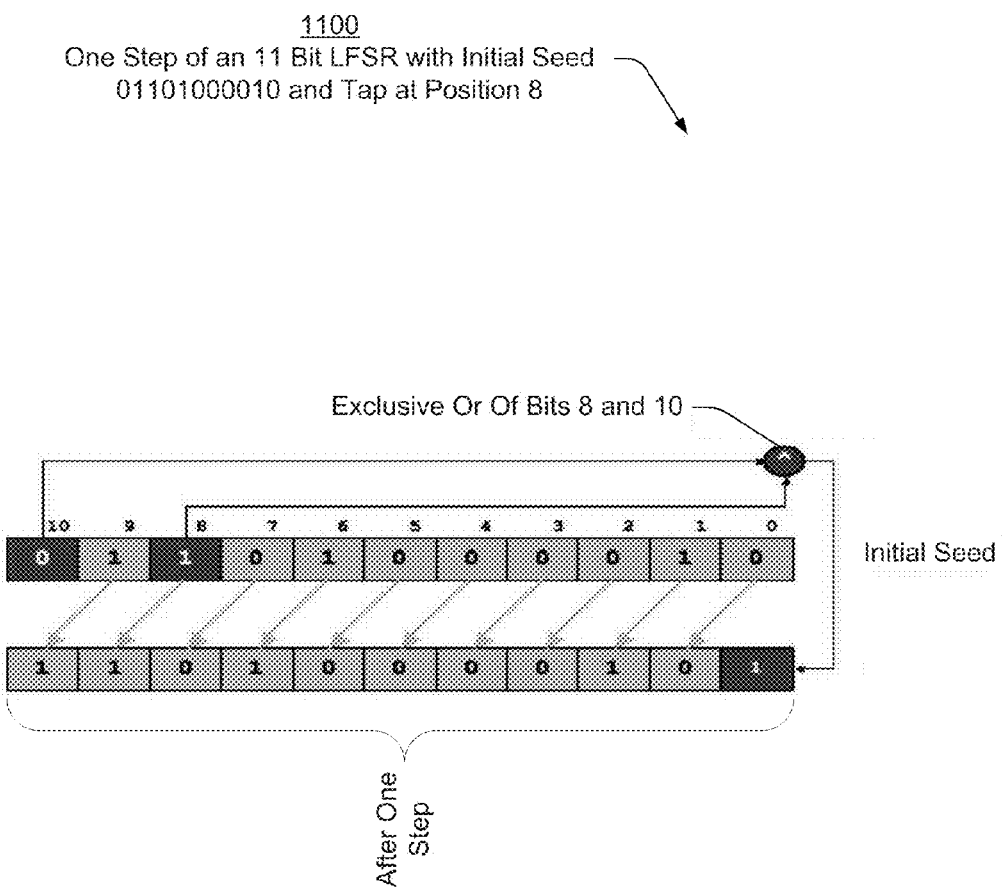
FIG. 11 is an exemplary linear feedback shift register for use in a system to improve a cryptosystem, according to one embodiment. More particularly.

FIG. 11 shows an exemplary one step of an 11 bit LFSR with initial seed 01101000010 and tap at position 8. More particularly, an iris image, e.g. biometric attribute, is taken and iris bits are generated using a Gabor Wavelet equation. If the stored image, e.g. stored biometric data, in a smart card, e.g. memory, substantially matches with the live eye iris pattern, then encryption will be done, otherwise termination will be occurred (policy based encryption to avoid the problem of variability). In other words, FIG. 11 shows exemplary use of LFSR working in diagrammatical form that how bits are shifted to left and how XOR function is applied between the previous state bits and current state bits. In one implementation, the smart card is secured with any strong algorithm. Then the stored iris template (e.g. stored biometric data) is used for encryption.

In one exemplary implementation, bits are extracted for the Initial Condition ("IC") using the hamming method to extract the positions and to feed a LFSR to generate a keystream for encryption. Other methods besides the hamming method can be used, for example, to extract that positions to feed the LFSR. Such methods include, for example, a "Diagonal Selection of bits," "Double Cross Diagonal Selection of bits," "Zig Zag selection, "Hash Table,", and/or so on. The same or another image, e.g. both being object data, may be an object for encryption. Image bits are generated by imread( ) function in MATLAB (MATrix LABoratory is a programming language for technical computing from The MathWorks™). The bits are passed through Gaussian noise to make image in binary format more complex. Xor operation is applied between keystream bits and image (Gaussian Noise added) bits. An encrypted image (Multimedia Hiding) is achieved. Now it could be securely transferred on a channel.

For the decryption process of system 10, the encrypted image is first XORed using the keystream from LFSR. The decrypted image is then passed into Gaussian function to have original image. These image bits can be reconstructed to original image by imshow(I) function in MATLAB. In one embodiment, the two dimensional aspects of the image is converted into one dimension and then transferred into binary format to get plain binary text to perform encryption.

In one embodiment, the entropy of a NASA Saturn image, e.g. picture, that was to be encrypted was found to be (H(x))=5.8784. The entropy varies with picture size and contents.

In cryptography, the avalanche effect refers to a desirable property of cryptographic algorithms, typically block ciphers and cryptographic hash functions. The avalanche effect is evident if, when an input is changed slightly (for example, flipping a single bit) the output changes significantly (e.g., half the output bits flip). In the case of quality block ciphers, such a small change in either the key or the plaintext should cause a drastic change in the ciphertext. TABLE 1 below shows two different avalanche effects between two different variables i.e. (Plain Text with Cipher Text) and (Key Stream with Cipher text). This is conceived by the permutation phenomena where order matters like PK, PC, and CK.

First permutation takes two variable Plain text (P) and Cipher Text (C). The second permutation takes considers Plain Text (P) and Key Stream (K). The third permutation takes Cipher Text (C) and Key Stream (K). In table 3 we can see the AvalanchePC and AvalancheCK are near to 50% change. This result can be further improved by using other biometric aspects or more complex stream cipher like Alternate step generating stream cipher or RC6 or A5, etc. The comparison is also shown in table 3 with DES. Since Avalanche effect of DES is bit higher then system 10, e.g. Biometric-Gaussian-Stream Cipher (BGS), but BGS is better in the sense that the present cipher is light weighted with one XOR operation and Gaussian function which takes less time to encrypt and decrypt.

TABLE 1

Avalanche Effect (Shannon's Diffusion)

| Cipher Name | AvalanchePC Effect | AvalancheCK Effect |
|---|---|---|
| BGS Cipher | 47.6563% | 50.713% |
| DES | 53.125% | 54.6875% |

TABLE 2 illustrates exemplary speed comparisons of Symmetric Ciphers. In system 10, e.g. the BGS cipher, the x* indicates the time taken by the Gaussian noise factor which is additional in comparison with RC4. It can be concluded from the table below that system 10, e.g. BGS, is more robust then DES and 3DES with respect to speed.

TABLE 2

Exemplary Speed Comparisons of Symmetric Ciphers

| Cipher Name | Key Length | Speed (Mbps) |
|---|---|---|
| DES | 56 | 9 |
| 3DES | 168 | 3 |
| RCS2 | Variable | 0.9 |
| RCS4 | Variable | 45 |
| (BGS) Cipher | Variable | 45-x* |

In TABLE 3, x* is a Gaussian noise factor and it depicts decrease in speed (in Mbps).

FIG. 11 describes an exemplary model for system 10, e.g. the Biometric-G-Stream (BGS) Cryptosystem. An iris image is taken and iris bits are generated using Gabor Wavelet equation. If the stored image in smart card substantially matches with a live eye iris pattern, then encryption will be done otherwise termination will be occurred (Policy based encryption to avoid the problem of variability).

An example algorithm for the stream cipher of system 10 is described below in reference to TABLE 3. For purposes of exemplary illustration, this pseudocode is written in MATLAB.

TABLE 3

EXEMPLARY NOVEL STREAM CIPHER ALGORITHM

```
 1  Begin
 2  ▶ Input Biometric Data in
 3  ▶ "Bio" variable
 4  IC<-- Bio(1), Bio(2),Bio     (4),    Bio(8),Bio(16),Bio
        (32),Bio,(64),Bio (128)]
 5  N<--128
 6  ▶ LFSR Key Generation
 7  For i<--1 to n
 8  Key(i) <--IC(8)
 9  IC(1)<--
        IC(2)XOR IC(5)
11  Shift each bit forward
10  end
11  ead Image <-- Input Image
12  <-- Image Data
13  nput <-- p
14  <-- Gauss Noise(I, p)
15  T<--I XOR Key
16  ecryption Process
17  T<-- CT XOR Key
```

TABLE 3-continued

EXEMPLARY NOVEL STREAM CIPHER ALGORITHM 18 nput<-- h
19 <-- Gauss Filter(PT,h)
20 how image <-- K
21 End The immediately following exemplary algorithm shown in TABLE 4 is useful to evaluate the avalanche effect for the Biometric-Stream cipher. For purposes of exemplary illustration, this code is written in MATLAB.

TABLE 4

EXEMPLARY EVALUATION OF THE AVALANCHE EFFECT FOR THE BIOMETRIC STREAM CIPHER

1 Begin
2 ▶ Finding the Avalanche
3 ▶ Effect/Shannon Diffusion
4 DiffCK<--Key XOR CT
5 DiffPK(i)<--PT XOR Key
6 DiffPC(i) <--PT XOR CT
7 Accum-->0
8 M<--128
9 For i<--1 to m
    Accum<-- DiffCK(i)+ Accum
    Accum<--DiffPK(i)+ Accum
    Accum<--DiffPC(i)+ Accum
10 end
11 PercCK<--Accum/128*100
12 AvalancheCK<--100-PercentCK
13 AvalanchePK<--100-PercPK
14 AvalanchePC<--100-PercPC
15 End In one example of using the systems and methods for biometric-gaussian-stream ciphers, an Iris code template is taken in binary. This image is then converted into iriscode for the purpose of simulation in MATLAB. System 10 uses a Gabor Wavelet equation for iriscode generation. It is stored in biometric string named "b" in line 2. First initial condition is generated by using the hamming method (i.e., $2^0, 2^1, 2^2, 2^3, 2^4, 2^5, 2^6 \ldots$) from the string "b" and stored in another string named as "IC" in line 4. The LFSR for loop is run to generate a key stream for the system 10 bio-stream cipher. In this implementation, the loop starts in step 7 and ends in step 10 to generate a key stream.

In one embodiment, the avalanche effect (Shannon's Diffusion) is calculated using MATLAB. A string "DiffPC" is declared in line 6. These strings illustrate the difference of bits in plain text and cipher text. In one implementation, for example, the string "DiffPC" is calculated in view of the difference in Plain Text and Cipher Text is determined by an XOR operation(s). In line 4, the DiffCK is calculated. A variable "Accumulator" is used for the summation of the difference in bits using the Xor function. The percentage difference in Plain Text and Cipher Text is calculated and stored in the accumulator in line 11. The avalanche effect between the Cipher Text and Key is also calculated and store in the variable "AvalancheCK" as is shown in line 12. The avalanche effect between the Plain Text and Key is shown in line 13. The value is stored in variable "AvalanchePK." In line 14, the avalanche effect is calculated and stored in variable "AvalanchePC".

The complexity of the system 10 algorithm is O(n). An example of the step wise runtime calculation immediately follows in TABLE 5:

TABLE 5

EXEMPLARY STEP WISE RUNTIME CALCULATION

| Begin | Cost | Times |
|---|---|---|
| 1. Input Biometric Data in 0/1 | 0 | 1 |
| 2. ▶ "Bio" variable | 0 | 1 |
| 3. IC<-- Bio(1), Bio(2),Bio (4), Bio(8), | | |
| 4. Bio(16),Bio (32),Bio,(64),Bio (128)] | C1 | 1 |
| 5. N<--128 | C2 | 1 |
| 6. ▶ LFSR Key Generation | 0 | 1 |
| 7. For i<--1 to n | C3 | n |
| 8.    Key(i) <--IC(8) | C4 | n-1 |
| 9.    IC(1)<-- IC(2)XOR IC(5) | C5 | n-1 |
| 10.    Shift each bit forward | C6 | n-1 |
| 11. end | | |
| 12. Read Image <-- Input Image | C7 | 1 |
| 13. I <-- Image Data | C8 | 1 |
| 14. Input <-- p | C9 | 1 |
| 15. J<-- Gauss Noise(I, p) | C10 | 1 |
| 16. CT<--J XOR Key | C11 | 1 |
| 17. ▶ Decryption Process | 0 | 1 |
| 18.   PT<-- CT XOR Key | C12 | 1 |
| 19. Input<-- h | C13 | 1 |
| 20. K <-- Gauss Filter(PT,h) | C14 | 1 |
| 21. Show image <-- K | C15 | 1 |
| 22. End | | |

Referring to TABLE 5, the "Cost" refers to the amount of time generally necessary to execute the code. The term "Times" means the number of iteration of code lines. The first two lines 1 & 2 are comments. Point 3 inserts Biometric template into Variable/Vector IC. Line 5 assigns 128 to N. Line 6 is again comment for reader. Lines 7, 8, 9, 10, 11 is a programmatic construct for loop for key assigning and XOR operation performance. Line 12 reads the image. Line 13 assigns image data to variable I. Line 14 takes input from user for Gaussian Noise function. Line 15 executes Gaussian function and assigns that data to variable/Vector J. Line 16 performs XOR function between J and Key. Line 17 is a comment. Line 18 is decryption process by Applying XOR operation between Key and CT. Line 19 takes input from user "h" which is Gaussian Filter parameter. Line 20 assigns Gaussian Filtered processed data to K Vector/Variable. Line 21 displays the decrypted image. Line 22 is end of the program.

The following eight (8) equations are associated with the algorithm of TABLE 5. $T(n)=\Sigma Cost*Times=0(1)+0(1)+0(1)+0(1)+C1(1)+C2(1)+C3(n)+C4(n-1)+C5(n-1)+C6(n-1)+C7(1)+C8(1)+C9(1)+C10(1)+C11(1)+C12(1)+C13(1)+C14(1)+C15(1)$. This equation represents cumulative the runtime of the each step of above algorithm. In other words it is the summation of the product of time and cost.

$T(n)=0\{1+1+1+1\}+(1) \{C1+C2+C7+C8+C9+C10+C11+C12+C13+C14+C15\}+(n)\{C3\}+(n-1)\{C4+C5+C6\}$. In this equation, the Cost with value "0", "1", "n" and "n-1" are taken as common from the summation of product equation.

$T(n)=0\{1+1+1+1\}+(1)\{C1+C2+C7+C8+C9+C10+C11+C12+C13+C14+C15\}+(n)\{C3\}+nC4+nC5+nC6-C4-C5-C6$. In this equation, the third product with "n-1" common is now distributed.

$T(n)=0 \{1+1+1+1\}+(1)\{C1+C2+C7+C8+C9+C10+C11+C12+C13+C14+C15\}+(n)\{C3+C4+C5+C6\}-C4-C5-C6\}$. In this equation, the $2^{nd}$ product with "n" common is also distributed.

$T(n)=0 \{1+1+1+1\}+(1) \{C1+C2+C7+C8+C9+C10+C11+C12+C13+C14+C15-C4-C5-C6\}+(n)\{C3+C4+C5+C6\}$. In this equation, cost with n times are taken common.

$T(n)=0+\{b\}\pm n\{a\}$. In this equation, algorithmically the above equation can be reduced to consider the first group of constants as "a" and $2^{nd}$ group as "b".

T(n)=a(n)+b. This equation is a simplification of the above equation.

T(n)=O(n). This is an asymptotic representation of equation.

CONCLUSION

Although the systems and methods for improving a crypto system have been described in language specific to structural features and/or methodological operations or actions, it is understood that the implementations defined in the appended claims are not necessarily limited to the specific features or actions described. Rather, the specific features and operations of system 10 are disclosed as exemplary forms of implementing the claimed subject matter.

For example, system 10 can be realized in hardware, software, or a combination of hardware and software. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The system 10 can also be embedded in a computer program product, which comprises all the features enabling the implementation of the methods described herein, and which—when loaded in a computer system—is able to carry out these methods. Computer program includes any expression, in any language, code or notation, of a set of instructions intended to cause a system having an information processing capability to perform a particular function either directly or after conversion to another language, code or notation, and/or reproduction in a different material form.

In one or more alternate implementations, the operations and/or functions illustrated in a flowchart block may occur out of the order noted in the figures. For example, two blocks shown in succession may be executed substantially concurrently, or the blocks may sometimes be executed in the reverse order, depending upon the functionality involved because the flow diagrams depicted herein exemplary. There may be many variations to these diagrams or the steps (or operations) described therein without departing from the spirit of this detailed description. For example, the steps may be performed concurrently and/or in a different order, or steps may be added, deleted, and/or modified. All of these variations are considered a part of the detailed description.

Furthermore, the use of the terms a, an, etc. do not denote a limitation of quantity, but rather denote the presence of at least one of the referenced item. The terminology used herein is to describe particular embodiments only and is not intended to be limiting of the systems and methods for improving a cryptosystem. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The invention claimed is:

1. A non-transitory computer-readable medium comprising:
   computer-executable instructions that when executed by a processor performing operations further comprises:
   scanning a biometric attribute of a unique iris for comparison with stored biometric data of a unique iris template;
   generating a keystream based upon the stored biometric data of the unique iris template using a linear feedback shift register to generate the keystream if the scanned biometric attribute of the iris substantially matches the stored biometric data of the unique iris template;
   encrypting stored biometric data of the scanned iris template using at least one of a Gaussian noise functions and a linear feedback shift register to encrypt the biometric data to create stored biometric data; and
   encrypting data based upon the keystream and the encrypted stored biometric data further comprises XOR'ing the keystream and the encrypted biometric data; and
   further comprises using a Gabor wavelet to convert the biometric attribute of the iris into iris bits that are used as a key for encryption and decryption; and
   wherein computer-executable instructions that when executed by a processor performing operations further comprises selecting specific iris bits using a Hamming method to feed the linear feedback shift register.

* * * * *